United States Patent
Falk et al.

(10) Patent No.: US 12,546,899 B2
(45) Date of Patent: Feb. 10, 2026

(54) CORRELATION MODULE AIDING FOR DIGITAL CONTROLLED CRYSTAL OSCILLATOR TEMPERATURE VARIATIONS

(71) Applicant: Samsung Electronics Co., Ltd., Suwon-si (KR)

(72) Inventors: Henry Dennis Falk, Long Beach, CA (US); Sigang Qiu, Sunnyvale, CA (US); Di Zhou, San Jose, CA (US); Mayank Amin, Mountain View, CA (US); John Kiolbasa, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 18/384,198

(22) Filed: Oct. 26, 2023

(65) Prior Publication Data

US 2024/0142633 A1 May 2, 2024

Related U.S. Application Data

(60) Provisional application No. 63/421,507, filed on Nov. 1, 2022.

(51) Int. Cl.
*G01S 19/23* (2010.01)
(52) U.S. Cl.
CPC .................................. *G01S 19/23* (2013.01)
(58) Field of Classification Search
CPC ....................................................... G01S 19/23

(Continued)

(56) References Cited

U.S. PATENT DOCUMENTS 10,454,482 B2 * 10/2019 Pavao Moreira ....... H03L 1/023
2018/0351511 A1 12/2018 Jun et al.

FOREIGN PATENT DOCUMENTS

CN 113285671 A 8/2021
WO 2012/100710 A1 8/2012

OTHER PUBLICATIONS

Trong-Hieu Tran et al., "A Low-ppm Digitally Controlled Crystal Oscillator Compensated by a New 0.19-mm$^2$ Time-Domain Temperature Sensor", IEEE Sensors Journal (vol. 17, Issue: 1, Jan. 1, 2017), Publication Date: Nov. 2, 2016, pp. 51-62, DOI: 10.1109/JSEN.2016.2623744.

(Continued)

*Primary Examiner* — Dominic D Saltarelli
(74) *Attorney, Agent, or Firm* — The Farrell Law Firm, P.C.

(57) ABSTRACT

A system and a method are disclosed for compensating a global navigation satellite system (GNSS) signal, including obtaining, by a correlation module, sample data which corresponds to a GNSS signal obtained based on an oscillator frequency of a crystal oscillator; obtaining, by the correlation module, aiding information which is determined based on information about the crystal oscillator; performing, by the correlation module, compensation processing on numerically-controlled oscillator (NCO) state data based on the aiding information, to obtain compensated NCO state data; performing, by the correlation module, correlation processing on the sample data based on the compensated NCO data; storing the compensated NCO state data in an NCO memory; and determining location information about a location of an electronic device corresponding to the correlation module based on the compensated sample data.

20 Claims, 11 Drawing Sheets

(58) Field of Classification Search
USPC .......................................................... 375/150
See application file for complete search history.

(56) References Cited

OTHER PUBLICATIONS

Ming-Da Tsai et al., "A Temperature-Compensated Low-Noise Digitally-Controlled Crystal Oscillator for Multi-Standard Applications", IEEE Radio Frequency Integrated Circuits Symposium, 2008, pp. 533-536, DOI: 10.1109/RFIC.2008.4561493.

* cited by examiner

| Carrier Frequency Aiding Value | Carrier Acceleration Aiding Value | Time Tag |
|---|---|---|
| ... | ... | |
| Carrier Frequency Aiding Value | Carrier Acceleration Aiding Value | Time Tag |
| Carrier Frequency Aiding Value | Carrier Acceleration Aiding Value | Time Tag |
| Carrier Frequency Aiding Value | Carrier Acceleration Aiding Value | Time Tag |

Aiding Count: n, ..., 2, 1, 0

Number of Bits: 32, 16, 16

FIG. 4

CORRELATION MODULE AIDING FOR DIGITAL CONTROLLED CRYSTAL OSCILLATOR TEMPERATURE VARIATIONS

CROSS-REFERENCE TO RELATED APPLICATION

This application claims the priority benefit under 35 U.S.C. § 119(e) of U.S. Provisional Application No. 63/421,507, filed on Nov. 1, 2022, the disclosure of which is incorporated by reference in its entirety as if fully set forth herein.

TECHNICAL FIELD

The disclosure generally relates to signal processing for a global navigation satellite system (GNSS). More particularly, the subject matter disclosed herein relates to improvements to temperature compensation for digital controlled crystal oscillators.

SUMMARY

In a global navigation satellite system (GNSS), for example the Global Positioning System (GPS), the Globalnaya Navigatsionnaya Sputnikovaya Sistema (GLONASS), the BeiDou Navigation Satellite System, the Galileo GNSS system. the Quasi-Zenith Satellite System (QZSS) signal, and the Korea Augmentation Satellite System (KASS), a GNSS receiver may be used in acquisition and tracking of satellites of the GNSS constellations. The GNSS receiver may include a digital controlled crystal oscillators (DCXO) which may provide the fundamental frequency reference for the GNSS receiver. However, the frequency of the signal which is output by the DCXO may vary according to the temperature of the DCXO, which may change at startup and throughout operation of the GNSS receiver.

To solve this problem, software included in the GNSS receiver may monitor the temperature of the DCXO, and based on knowledge of the frequency response of the DCXO to temperature variations, may calculate corrections to be applied when performing signal processing on the GNSS signal. For example, the corrections may be applied to values stored in a numerically-controlled oscillator (NCO) memory, which may be used to store the basic time and frequency state of the signal processing being performed on the GNSS signal.

These corrections may be used to compensate for the temperature variations in the DCXO and the resultant variation in DCXO frequency. Aiding corrections may be generated by hardware or by software in order to track GNSS signals. For example, an aiding path used for performing tracking corrections may also be used for performing aiding correction which compensates for the DCXO temperature variations.

One issue with the above approach is that the block of data needed to generate tracking corrections, and therefore the update rate of these tracking corrections, may be very large compared to the update rate which may be useful for DCXO corrections. For example, in some methods of aiding used for tracking corrections, the aiding may be applied after correlation processing is performed, and after a block of post-detection integration (PDI) data has been accumulated and processed.

To overcome these issues, systems and methods are described herein which may allow the application of corrections which are further upstream in the GNSS signal processing. For example, according to some embodiments, DCXO temperature correction may be applied to the signal processing prior to correlation, rather than after correlation and accumulation of a large block of data.

The above approaches may improve on previous methods because they may enable relatively more frequent application of aiding corrections to the GNSS signal processing in order to compensate for DCXO frequency variations. For example, a block of PDI data may correspond to twenty milliseconds of sample data from the GNSS signal, which may mean that previous methods may only be capable of applying DCXO aiding corrections at a time interval of twenty milliseconds. In contrast, according to embodiments of the present disclosure, DCXO aiding corrections may be applied at a much smaller time interval, for example a time interval of approximately 1 millisecond or less.

In an embodiment, a method for compensating a GNSS signal includes: obtaining, by a correlation module, sample data which corresponds to a GNSS signal obtained based on an oscillator frequency of a crystal oscillator; obtaining, by the correlation module, aiding information which is determined based on information about the crystal oscillator; performing, by the correlation module, compensation processing on numerically-controlled oscillator (NCO) state data based on the aiding information, to obtain compensated NCO state data; performing, by the correlation module, signal processing on the sample data based on the compensated NCO state data, to obtain compensated sample data; and performing, by the correlation module, correlation processing on the compensated sample data; and determining location information about a location of an electronic device corresponding to the correlation module based on a result of the correlation processing.

In an embodiment, a system for compensating a GNSS signal includes: a crystal oscillator configured to output a clock signal indicating an oscillator frequency, and a status signal indicating information about the crystal oscillator; a radio-frequency (RF) integrated circuit configured to receive a GNSS signal, and to output RF data corresponding to the GNSS signal based on the oscillator frequency; and an electronic device including at least one processor configured to: obtain, by a correlation module, sample data which corresponds to the RF data; obtain, by the correlation module, aiding information which is determined based on the temperature of the crystal oscillator; perform, by the correlation module, compensation processing on numerically-controlled oscillator (NCO) state data based on the aiding information, to obtain compensated NCO state data; perform, by the correlation module, signal processing on the sample data based on the compensated NCO state data, to obtain compensated sample data; and perform, by the correlation module, correlation processing on the compensated sample data; and determine location information about a location of the electronic device based on a result of the correlation processing.

In an embodiment, an electronic device for compensating a global navigation satellite system (GNSS) signal includes: at least one processor configured to: obtain, by a correlation module, sample data which corresponds to a GNSS signal obtained based on an oscillator frequency of a crystal oscillator; obtain, by the correlation module, aiding information which is determined based on a temperature of the crystal oscillator; perform, by the correlation module, compensation processing on numerically-controlled oscillator (NCO) state data based on the aiding information, to obtain compensated NCO state data; perform, by the correlation module, signal processing on the sample data based on the compensated NCO state data, to obtain compensated sample data; and perform, by the correlation module, correlation processing on the compensated sample data; and determine location information about a location of the electronic device based on a result of the correlation processing.

BRIEF DESCRIPTION OF DRAWING

In the following section, the aspects of the subject matter disclosed herein will be described with reference to exemplary embodiments illustrated in the figures, in which:

FIG. 4 is a block diagram showing an example of a configuration of the correlation aiding information.

DETAILED DESCRIPTION

Figure 1A:
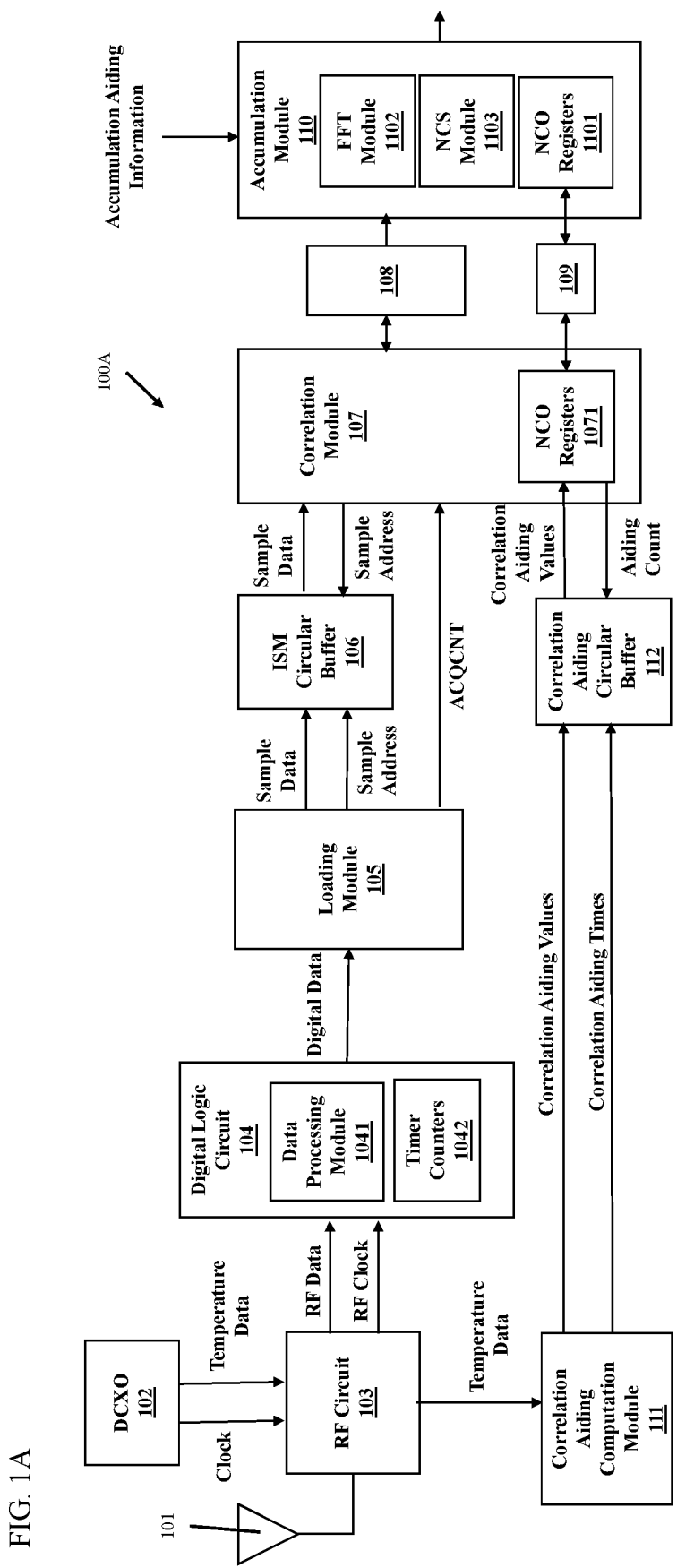
FIGS. 1A, 1B, and 1C are block diagrams showing examples of configurations of a global navigation satellite system (GNSS) receiver system, according to embodiments.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1A is a block diagram showing an example of a configuration of a global navigation satellite system (GNSS) receiver system, according to an embodiment. In embodiments, the GNSS receiver system may correspond to or may operate according to at least one from among the Global Positioning System (GPS), the Globalnaya Navigatsionnaya Sputnikovaya Sistema (GLONASS), the BeiDou Navigation Satellite System, the Galileo GNSS, the Quasi-Zenith Satellite System (QZSS), the Korea Augmentation Satellite System (KASS), and any other GNSS system. As shown in FIG. 1A, the GNSS receiver system 100A may include an antenna 101, a digital controlled crystal oscillator (DCXO) 102, an RF circuit 103, a digital logic circuit 104, a loading module 105, an input sample memory (ISM) circular buffer 106, a correlation module 107, a coherent memory 108, a numerically-controlled oscillator (NCO) memory 109, an accumulation module 110, a correlation aiding computation module 111, and a correlation aiding circular buffer 112.

The antenna 101 may receive a GNSS signal, which may be processed by RF circuit 103. For example, the RF circuit 103 may perform analog operations such as frequency shifting and filtering. These analog operations may be performed based on an oscillator frequency provided by the DCXO 102. The RF circuit 103 may then convert its output from analog to digital using analog to digital converters (ADCs). The RF circuit 103 may output RF data which may include these digital samples, and may also output an associated RF clock signal. In embodiments, the RF clock signal may be referred to as a 96 fx clock signal, and may have a frequency of about 98 MHz. In embodiments, the RF circuit 103 may be, or may be included in, a radio-frequency integrated circuit (RFIC).

The digital logic circuit 104 may then perform digital signal processing on the RF data, for example using a data processing module 1041. In embodiments, the digital signal processing performed by the digital logic circuit 104 may be specific to the different GNSS constellations, and to the frequency bands that the constellations use. For example, the digital signal processing for a Global Positioning System (GPS) L1 signal may be different than the digital signal processing for a Globalnaya Navigatsionnaya Sputnikovaya Sistema (GLONASS) L1 signal, which may be different from the digital signal processing for a BeiDou Navigation Satellite System L5 signal, and so on. In embodiments, the digital signal processing may include frequency mixing, filtering, interference tone cancellation, and quantization. In embodiments, the digital logic circuit 104 may be, or may be included in, an RFIC.

The digital logic circuit 104 may include timer counters 1042 which may maintain a count of time using several clocks which may be generated from the RF clock signal. For example, the timer counters 1042 may include a timer counter which counts at a 16 fx rate, and which produces a time count signal referred to as ACQCNT16FX. The timer counters 1042 may further include timer counters which count at rates including one or more of a 12 fx rate, a 20 fx rate, and a 24 fx rate, and which produce time count signals referred to as ACQCNT12FX, ACQCNT20FX, and ACQCNT24FX, respectively. These time count signals may be associated with sample data generated at the corresponding data rates. In embodiments, the sample data may be time tagged by the timer counters 1042.

The loading module 105 may receive sample data from the digital logic circuit 104, and may load the sample data into the ISM circular buffer 106. There may be separate ISMs for the different types of sample data (e.g., GPS L1, GPS L5, GLONASS L1, etc) and for the different sampling rates (e.g., 2 fx, 16 fx, 20 fx, etc). The location to which each piece of sample data (which may be referred to as a sample) is stored in the ISM circular buffer 106 may depend on the value of ACQCNT associated with that piece of sample data. In embodiments, this location may be referred to as a sample address corresponding to the sample. For example, samples at a 2 fx rate may be written into the ISM circular buffer 106 using a sample address generated based on ACQCNT16FX. As another example, samples at a 12 fx rate may be written into the ISM circular buffer 106 using sample addresses based on ACQCNT12FX.

The correlation module 107 may receive sample data from the ISM circular buffer 106 and may correlate this sample data against pseudo-random number (PRN) codes which may be modulated onto the GNSS signals. For example, each GNSS constellation may transmit specific repeated PRN codes for specific L1, L2, or L5 signals. The time of transmission of these PRN codes may be known, and by locking on to these codes in the received GNSS signal during acquisition and tracking, the time of reception of the signal may be determined, which may allow the GNSS receiver system 100A to generate location information about a location of the GNSS receiver system 100A.

The correlation module 107 may be a time-multiplexed correlator which operates on a channel-by-channel basis. In embodiments, the correlation module 107 may be referred to as a correlation engine. The correlation module 107 may operate based on a clock rate which is much faster than the sample data is filled into the ISM circular buffer 106. This may allow repeated use of the correlation module 107 to acquire and track multiple satellites concurrently using respective channels. For example, if the ISM circular buffer 106 contains ten milliseconds of sample data, and is being continuously fed, then the correlation module 107 may read in and process samples corresponding to a first channel from the 10 milliseconds of sample data, and may store the results of the processing in the coherent memory 108. After this is done, the correlation module 107 may read in and process samples corresponding to a second channel from the 10 milliseconds of sample data, and so forth. For each channel, the correlation module 107 may use a time pointer to identify the time location of the sample it currently needs from the ISM circular buffer 106. This time pointer may be referred to as a code phase pointer. In embodiments, the code phase pointer may be used to compare against a particular ACQCNT, for example the ACQCNT16FX, to determine a time for performing aiding, for example correlation aiding operations, examples of which are discussed in greater detail below.

The correlation module 107 may include NCO registers 1071. The NCO registers 1071 may be used to store the time and frequency state of a particular channel. This state may include two parameters: a code phase parameter and a carrier phase parameter. The code phase parameter may indicate a time location of the sample being processed, and the carrier phase parameter may indicate the phase of the carrier frequency modulating the sample. The carrier frequency may be removed before the PRN code can be searched. In order to properly process samples, the NCO memory 109 may include registers for the carrier phase parameter, the code phase parameter, a carrier acceleration parameter, a carrier frequency parameter, and a code frequency parameter. Aiding may be performed by adjusting these parameters. A channel's NCO state may be stored in the NCO memory 109 between context periods corresponding to the channel. At the start of a context period, the correlation module 107 may read in the NCO values corresponding to the NCO state, which may be stored in the NCO memory 109. The NCO values may updated based on each context operation. At the end of the context period, the correlation module 107 may store the final NCO state back to the NCO memory 109, to be used when the channel is next processed.

The accumulation module 110 may obtain the data which is produced by the correlation module 107 and stored in the coherent memory 108, and then may perform further processing. The accumulation module 110 may include a fast Fourier transform (FFT) module 1102 which may generate frequency information, and a non-coherent summation (NCS) module 1103 which may allow for longer accumulation periods, and therefore greater sensitivity of acquired signals. In embodiments, the accumulation module 110 may be referred to as an FFT and NCS engine. The FFT module 1102 and the NCS module 1103 may operate on blocks of data corresponding to T1 time periods and post-detection integration (PDI) time periods. In embodiments, a T1 time period may correspond to the duration of each sample provided into the FFT module 1102, and a PDI time period may correspond to the time period covered by all of the T1 blocks feeding into an FFT module 1102. The accumulation module 110 may only operate the FFT module 1102 after a block of sample data corresponding to an entire PDI time period has been gathered. After performing the FFTs on the current data for a channel, the FFT module 1102 may need to wait a full PDI time period before it can operate again on this channel. The T1 time period may be on the order of one millisecond or multiple milliseconds. However, embodiments are not limited thereto, and in some embodiments the T1 time period may be less than 1 millisecond. As an example, a PDI time period for GPS may be about 20 milliseconds.

The accumulation module 110 may also access the NCO memory 109. After performing the FFT and NCS operations, the accumulation module 110 can retrieve the current NCO state and store the corresponding NCO values in the NCO register 1101. The accumulation module 110 may then perform two types of aiding: hardware aiding and software aiding. In embodiments, the aiding performed by the accumulation module 110 may be referred to as accumulation aiding. The hardware accumulation aiding may be performed by hardware tracking loops (HWTL). The HWTL may monitor the flow of data produced by the FFT module 1102, and may calculate corrections to the NCO state stored in the NCO register 1101 to maintain a proper tracking lock on the GNSS signal. In embodiments, software operating on the GNSS receiver system 100A may similarly monitor data produced by the accumulation module 110, and may determine NCO corrections to maintain tracking lock. These may be referred to as software tracking loops (SWTL). Both of these accumulation aiding corrections may be applied to the NCO values stored in the NCO register 1101, and the result may be written back to the NCO memory 109 at the end of the context period. Hardware control of the GNSS receiver system 100A may ensure that for a particular channel, the correlation module 107 may operate first on the NCO state and store the final version of the NCO in the NCO memory 109. Then, only after the correlation module 107 has stored its final state, the accumulation module 110 may read the NCO state and update it with hardware and/or software accumulation aiding values determined by the HWTL and the SWTL of the accumulation module 110.

The accumulation aiding described above may have a problem when trying to address aiding compensation for crystal temperature variations in the DCXO 102. Both the HWTL and the SWTL may only operate at the PDI rate (e.g., approximately 20 milliseconds). While the software accumulation aiding could potentially include temperature compensation for the DCXO 102, it may only be applied at a PDI rate (e.g., approximately 20 milliseconds).

Therefore, embodiments may provide a path for aiding to be performed in the correlation module 107 at a higher rate. For example, in some embodiments, the aiding may be performed in the correlation module 107 at a rate of one millisecond or faster. In embodiments, the aiding performed by the correlation module 107 may be referred to as correlation aiding.

Referring still to FIG. 1A, in the correlation aiding path, the correlation aiding computation module 111 may monitor temperature information generated by the DCXO 102, and may calculate correlation aiding information which may be used to correct values of the carrier acceleration parameter and the carrier frequency parameter of the NCO state. In embodiments, these may be the parameters which are directly affected by frequency variations of the DCXO 102. The correlation aiding computation module 111 may then write the correlation aiding information, along with a time tag to indicate when to apply the correction, into the correlation aiding circular buffer 112. Accordingly, in embodiments, the correlation aiding information may include a carrier acceleration aiding value, a carrier frequency aiding value, and the time tag. As an example, the correlation aiding circular buffer 112 may contain sixty-four instances or lines of this correlation aiding information, however embodiments are not limited thereto. In embodiments, the corrections indicated by the aiding information may be set to be any distance apart, for example one milliseconds apart.

At the start of a channel's context period, the correlation module 107 may use an aiding pointer, for example a stored aiding count, to reload the last line of correlation aiding information to be applied from the correlation aiding circular buffer 112. The correlation module 107 may then start channel processing operations for a channel. When the channel processing performed by the correlation module 107 reaches the time tag indicated as the next aiding time (which may be for example expressed in terms of code phase), then the correlation module 107 may update the NCO registers 1071 based on the correlation aiding information. After updating the NCO registers 1071, the correlation module 107 may immediately read the next line of correlation aiding information to be applied. When the code phase reaches the next time tag, the corrections indicated by the next line of correlation aiding information may applied to the NCO registers 1071. This correlation aiding operation may occur for as many aiding periods as occur in a context period. For example, in some embodiments a context period of seven milliseconds may have seven aiding events. At the end of the context period, the last aiding pointer, for example the last aiding count, may be stored in the NCO memory 109 for retrieval the next time the correlation module 107 processes the channel.

Therefore, embodiments may allow the correlation module 107 to perform correlation aiding operations such as temperature corrections at a rate that is much higher than some other approaches. For example, instead of only performing aiding operations once every PDI time period, which may be for example 20 milliseconds, embodiments may allow the aiding operations to be performed once every one millisecond, or any other rate.

For example, as discussed above, an NCO state may refer to the basic time/frequency state of a channel in the correlation module 107. The NCO state may be an indication of the time of the sample which is currently being processed, and the carrier phase of the sample. As discussed above, the NCO state may include parameters for carrier acceleration, carrier frequency, carrier phase, code frequency and code phase. There may be three copies of the NCO state, one in the NCO memory 109, one in the correlation module 107 (e.g., the NCO registers 1071), and one in the accumulation module 110 (e.g., the NCO registers 1101). The copy of the NCO state stored in the NCO memory 109 may be referred to as the master copy. When the correlation module 107 begins a context period for a channel, the correlation module 107 may read into the NCO registers 1071 values of the NCO state from the NCO memory 109. The correlation module 107 may then update the NCO values during channel processing operations as it processes data from the ISM circular buffer 106. In addition, the correlation module 107 may perform correlation aiding to update the NCO state at aiding times based on correlation aiding information. At the end of a context period, the last NCO state, indicated by values stored in the NCO registers 1071, may be transferred to, and stored in, the NCO memory 109. After the correlation module 107 operates on a channel, then the accumulation module 110 may read into the NCO registers 1101 values of the NCO state from the NCO memory 109 for that channel. Then, every time a boundary of a PDI period is reached, the accumulation module 110 may update the NCO state based on accumulation aiding information provided by the HWTL and the SWTL. At the end of the context period for the accumulation module 110, the last NCO state, indicated by values stored in the NCO registers 1101, may be transferred to, and stored in, the NCO memory 109 to prepare for the next context period.

Figure 1B:
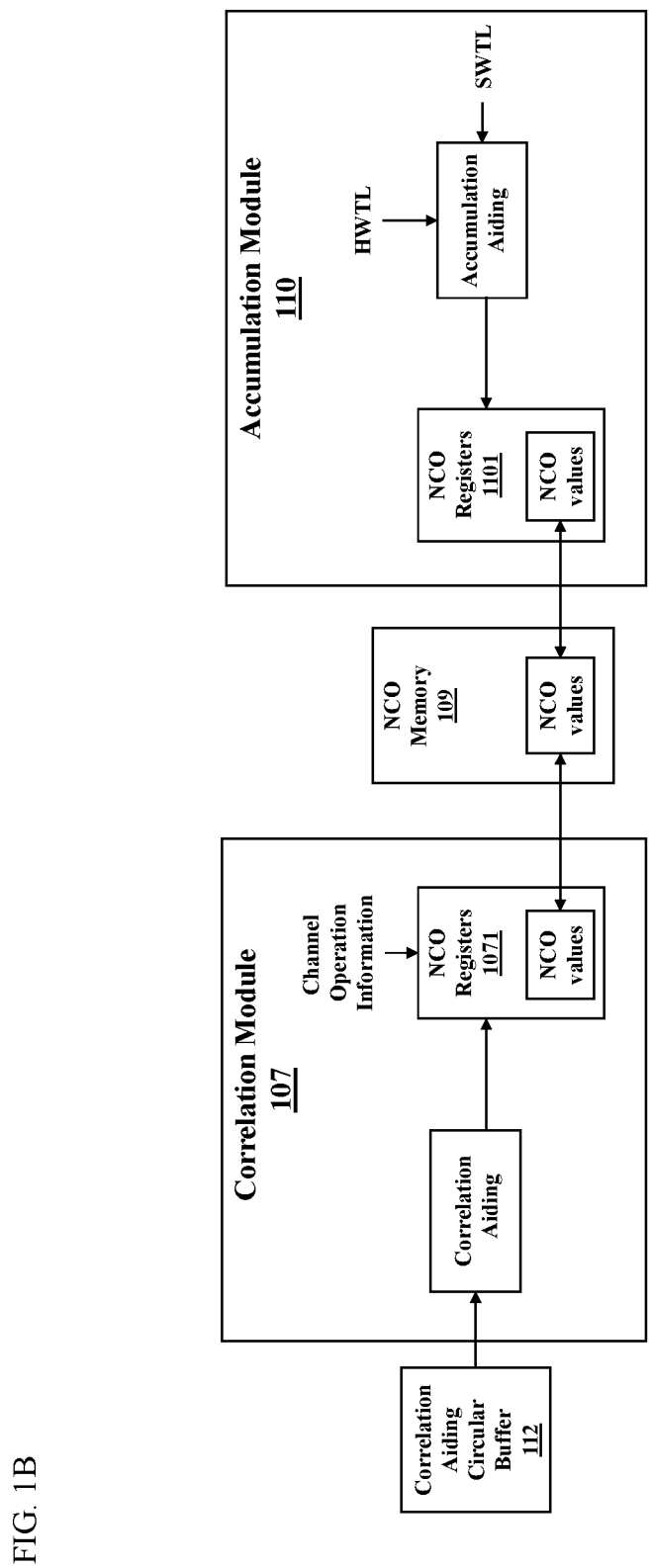

FIG. 1B is a block diagram showing a conceptual arrangement of several elements of a GNSS receiver system, according to an embodiment. As shown in FIG. 1B, and as discussed above, the NCO values which may be stored in at least one of the NCO registers 1071, the NCO memory 109, and the NCO registers 1101, may include basic timing information, for example carrier acceleration information, carrier frequency information, carrier phase information, code frequency information, and code phase information. The correlation aiding may be applied to the NCO values stored in the NCO registers 1071 at a relatively fast rate, for example a 1 millisecond rate, and may be used to update carrier acceleration information and carrier frequency information included in the NCO values stored in the NCO registers 1071. The NCO values stored in the NCO registers 1071 may also be updated based on channel operation information corresponding to a state of the channel. The accumulation aiding may be applied to the NCO values stored in the NCO registers 1101 at a relatively slower rate, for example the PDI rate. The accumulation aiding may be determined based on outputs of the SWTL and the HWTL. For example, each of the SWTL and the HWTL may be used to update the carrier acceleration information, carrier frequency information, carrier phase information, code frequency information, and code phase information included in the NCO values stored in the NCO registers 1101.

Figure 1C:
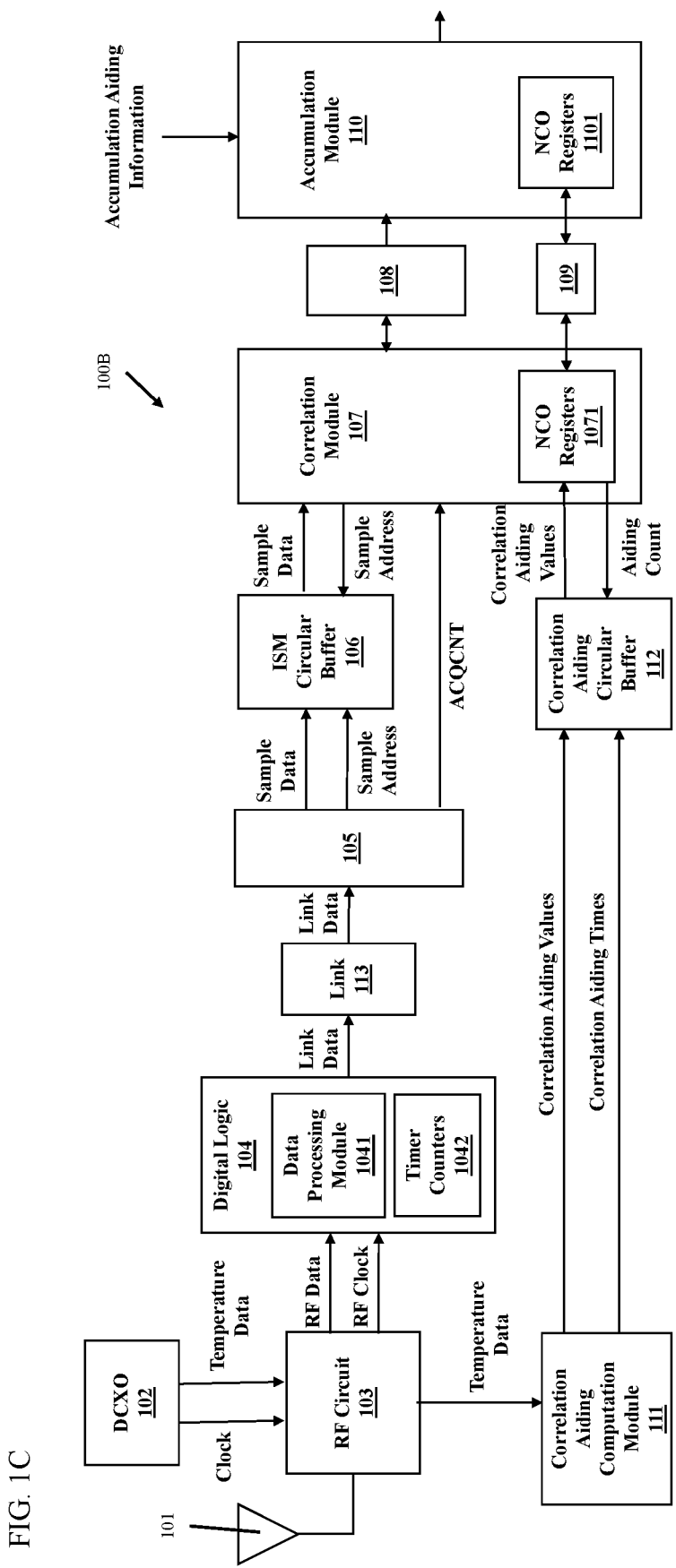

FIG. 1C is a block diagram showing another example of a configuration of a GNSS receiver system, according to an embodiment. As shown in FIG. 1C, the GNSS receiver system 100B may be similar to the GNSS receiver system 100A, except that the GNSS receiver system 100B may further include a link 113 which may be used to pass link data from the digital logic circuit 104 to the loading module 105. Because the other elements of the GNSS receiver system 100B may operate similarly to the elements of the GNSS receiver system 100A, redundant or duplicative description thereof is omitted.

Figure 2:
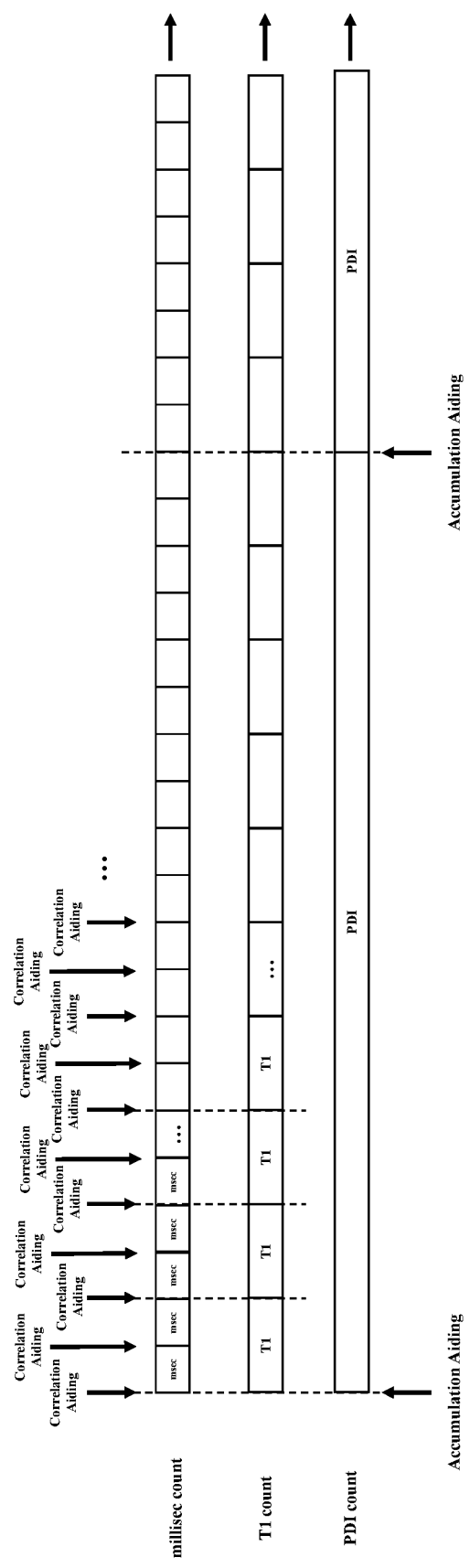
FIG. 2 is a timing diagram illustrating an example of a time relationship between aiding operations, according to embodiments.

FIG. 2 is a timing diagram illustrating an example of a time relationship between aiding operations, according to embodiments. As discussed above, the T1 time period may correspond to the duration of each sample input into the FFT module 1112, and the PDI time period may correspond to the total amount of time covered by all the samples input into the FFT module 1112. For example, in the case of a GPS tracking channel, each T1 time period may be one millisecond, and each PDI time period may be 20 milliseconds. In this case, twenty samples may be fed into a twenty-input, 32-point FFT performed by the FFT module 1102. In embodiments, the twenty samples may be zero-padded to thirty-two inputs. As another example, a T1 time period of two milliseconds and a PDI time period of 20 milliseconds may correspond to a ten input (zero-padded to sixteen inputs) 16-point FFT performed by the FFT module 1102. As shown in FIG. 2, accumulation aiding performed by the accumulation module 110, for example the software and hardware aiding discussed above, may only be applied at boundaries of the PDI time periods. In contrast, the correlation aiding performed by the correlation module 107 may be applied with much finer granularity, for example once every one millisecond, or even finer.

Figure 3:
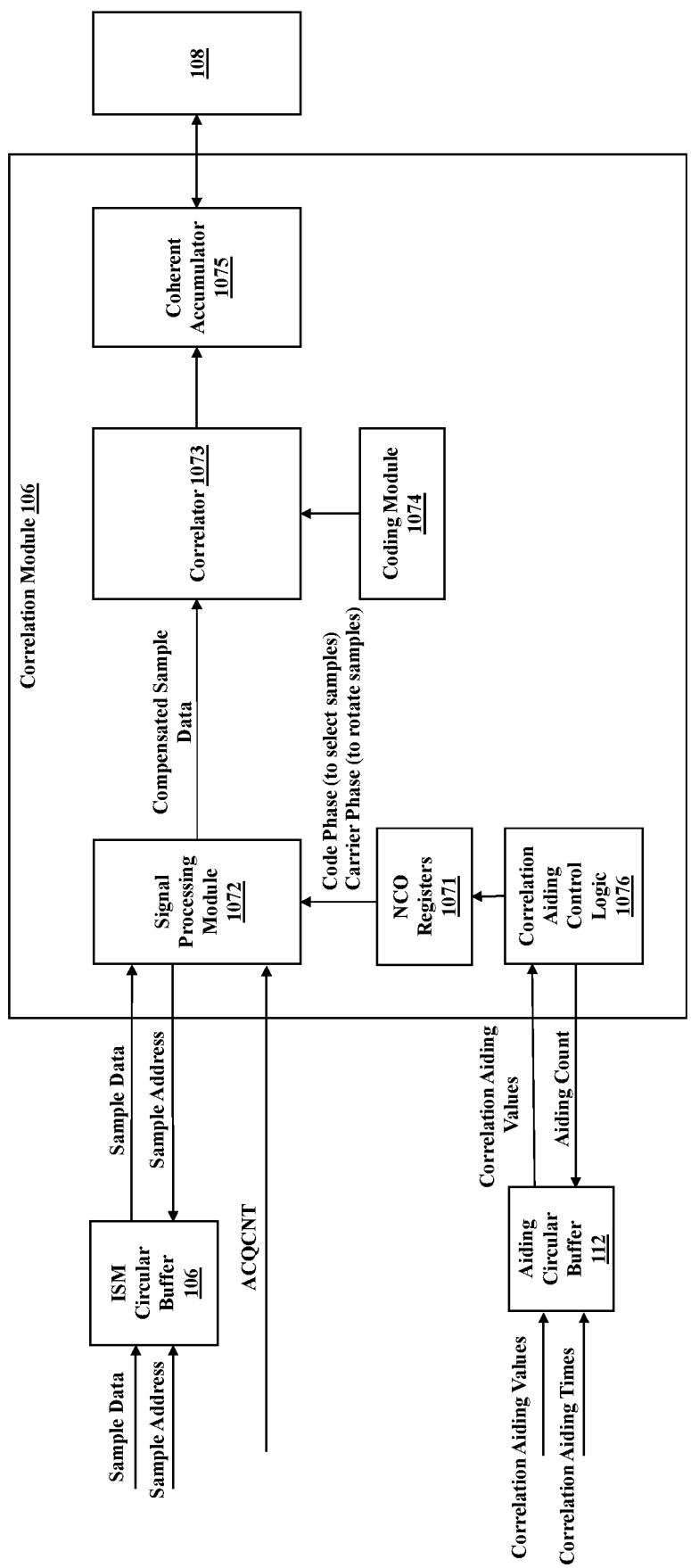
FIG. 3 is a block diagram showing an example of a configuration of a correlation module.

FIG. 3 is a block diagram showing an example of a configuration of the correlation module 107. The front end of the correlation module 107 may read in sample data from the ISM circular buffer 106. The sample to be read may be selected using the code phase indicated by a value of the code phase parameter of the NCO state stored in the NCO registers 1071. The location of all data in the ISM circular buffer 106 is associated with time in the form of ACQCNT. For example, in some embodiments the ACQCNT time of a sample may be translated into an address location in the ISM circular buffer 106. Similarly, the code phase may be associated with time. For example, the code phase may determine the location in the ISM circular buffer 106 to obtain a particular sample.

Samples read from the ISM circular buffer 106 may then be processed in the signal processing module 1072. The signal processing module 1072 may rotate the samples using the carrier phase indicated by the carrier phase parameter of the NCO state stored in the NCO registers 1071. This rotation may remove the carrier frequency from the signal processing, and may allow the rotated sample to be correlated against the PRN code.

Next, the output of the signal processing module 1072 may be correlated, using the correlator 1073, against a PRN code generated by the coding module 1074. The result of the correlation may be further accumulated by the coherent accumulator 1075 for periods of time, for example T1 time periods, and may be stored in the coherent memory 108 for use by the accumulation module 110.

The NCO registers 1071 may be fundamental to this operation. For example, the code phase indicated by a value of the code phase parameter of the NCO state stored in the NCO registers 1071 may determine the location of samples in the ISM circular buffer 106 to be processed, and the carrier phase indicated by a value of the carrier phase parameter of the NCO state stored in the NCO registers 1071 may determine the carrier rotation to be performed on those samples. To perform the correlation aiding, the correlation module 107 may obtain correlation aiding information, for example correlation aiding values stored in the correlation aiding circular buffer 112, and may apply the correlation aiding values to the carrier acceleration parameter and carrier frequency parameter stored in the NCO registers 1071.

FIG. 4 is a block diagram showing an example of a configuration of the correlation aiding information used by the correlation module 107 to perform correlation aiding. The correlation aiding information may include correlation aiding values such as a carrier acceleration aiding value and a carrier frequency aiding value, which may be stored along with a time tag which may indicate an intended time for the correlation aiding values to be applied. However, embodiments are not limited thereto. For example, in some embodiments the correlation aiding information may allow aiding and corrections other than carrier frequency and acceleration. The correlation aiding circular buffer 112 may be programmed to store a selectable number of lines, for example 64 lines. Each line of the correlation aiding circular buffer 112 may be associated with a particular aiding count, which may correspond to a line number in a table. Therefore, the correlation module 107 may retain this aiding count in memory in order to determine, at the start of each context period, which line was the last line used in the preceding context period. After the correlation module 107 applies a line of correlation aiding information, the correlation module 107 may immediately retrieve the next line of correlation aiding information, and then apply the next line of correlation aiding information when the corresponding time tag is reached by ACQCNT.

Figure 5:
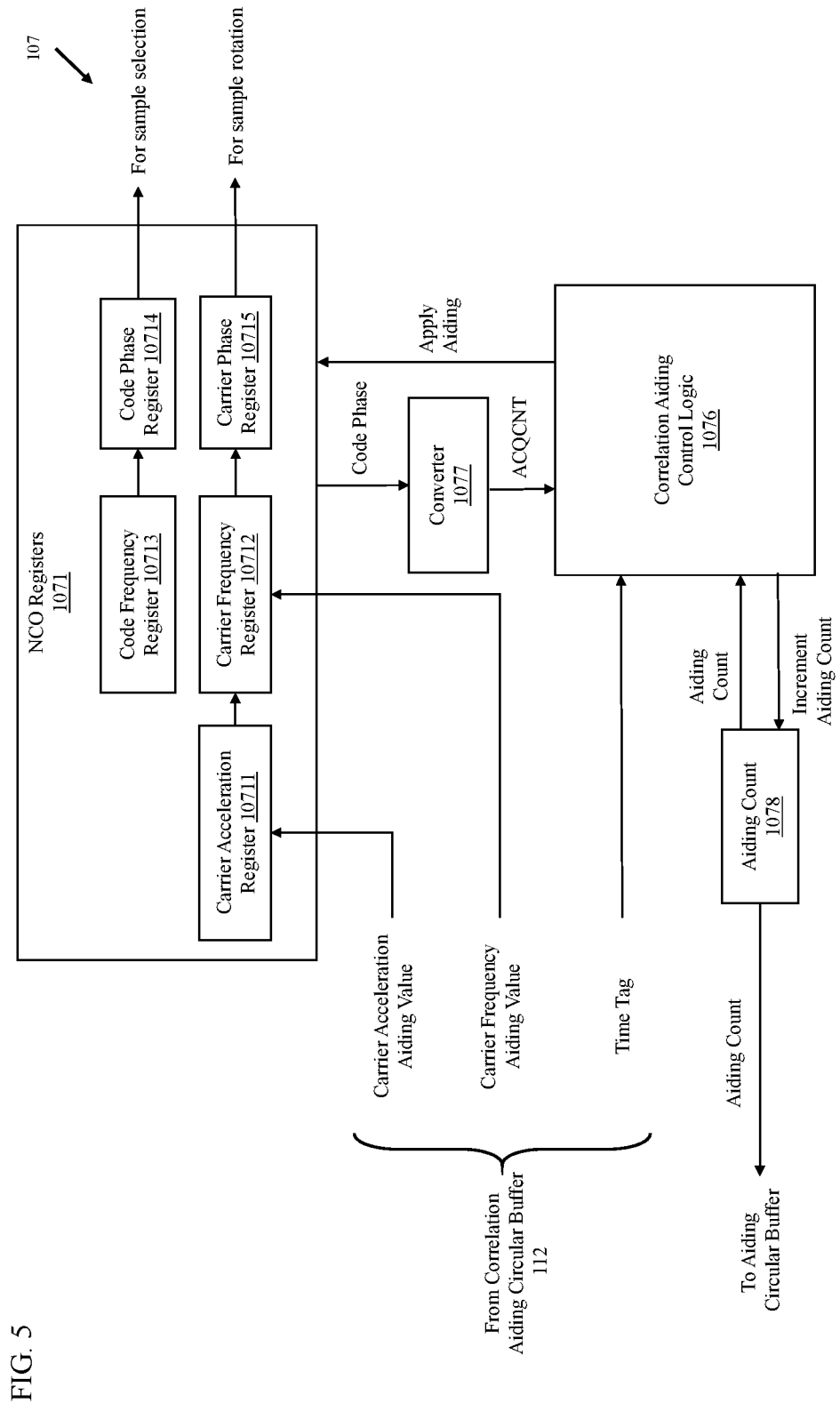
FIG. 5 is a block diagram showing another example of a configuration of a correlation module.

FIG. 5 is a block diagram showing another example of a configuration of the correlation module 107. For convenience of description and illustration, some elements which are included in the correlation module 107 as described above are omitted from FIG. 5.

At the start of a context period, the aiding count 1078 may be retrieved from the NCO memory 109. The aiding count 1078 may indicate to the correlation aiding control logic 1076 the last line of the correlation aiding circular buffer 112 which was read during the preceding context period, and the correlation may reload that line to be used during the present context period. As discussed above, the line retrieved from the correlation aiding circular buffer 112 may include correlation aiding information, and the correlation aiding information may include a carrier acceleration aiding value, a carrier frequency aiding value, and a time tag indicating a time to apply the correlation aiding. After all the aiding information has been gathered and prepared, the correlation module 107 may perform a normal correlation processing operation, for example based on values of the carrier acceleration parameter stored in the carrier acceleration register 10711, the carrier frequency parameter stored in the carrier frequency register 10712, the code frequency parameter stored in the code frequency register 10713, the code phase parameter stored in the code phase register 10714, and the carrier phase parameter stored in the carrier phase register 10715.

As this correlation processing operation proceeds, the code phase parameter of the NCO state stored in the code phase register 10714 of the NCO registers 1071 may be incremented as each sample is processed. Therefore, the value of the code phase parameter stored in the code phase register 10714 may be an indication of the time associated with the latest sample read from the ISM circular buffer 106. When the value of the code phase parameter reaches the aiding time indicated by the time tag, then the correlation aiding values may be applied by a pulse from the correlation aiding control logic 1076 to the NCO registers 1071. In embodiments, the value of the code phase parameter may be converted by a converter 1077 into a value of ACQCNT to be used by the correlation aiding control logic 1076. For example, when the pulse reaches the NCO registers 1071, the carrier acceleration aiding value may be added into the carrier acceleration register 10711 of the NCO registers 1071, and the carrier frequency aiding value may be added into the frequency register 10712 of the NCO registers 1071.

After the correlation aiding values have been applied, the correlation aiding control logic 1076 may increment the aiding count 1078 by one, may command the retrieval of the next line from the correlation aiding circular buffer 112, and may prepare for the next correlation aiding operation. This may proceed for the duration of the channel's context. For example, when correlation aiding is performed at a rate of one millisecond, there may be N aiding applications performed during a context period which is N milliseconds long. For example, when the context period is seven milliseconds long, correlation aiding may be performed seven times. At the end of the context period, the last value of the aiding count 1078 may be stored in the NCO memory 109 for use in the next context.

Figure 6A:
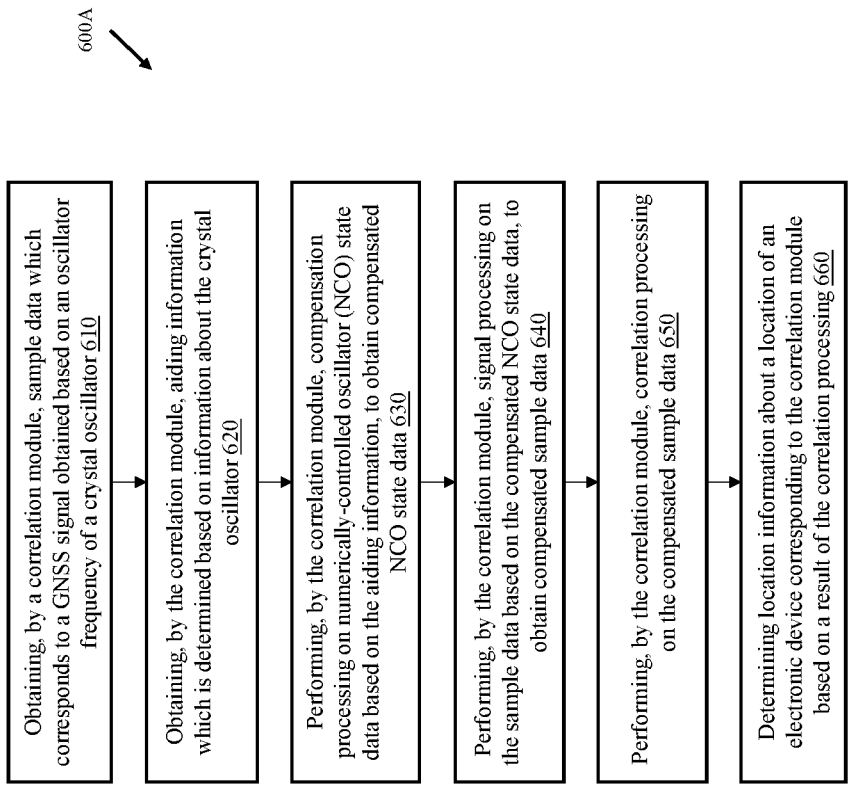
FIGS. 6A and 6B are flow charts of processes for compensating a GNSS signal, according to embodiments.

FIG. 6A is a flow chart of process 600A for compensating a GNSS signal, according to an embodiment. In some implementations, one or more process blocks of FIG. 6A may be performed by one or more of the elements discussed above, for example one or more of the GNSS receiver system 100 and the elements included therein, and the correlation module 107 and the elements included therein.

As shown in FIG. 6A, process 600A may include obtaining, by a correlation module, sample data which corresponds to a GNSS signal obtained based on an oscillator frequency of a crystal oscillator (block 610). In embodiments, the correlation module may correspond to the correlation module 107 discussed above, and the crystal oscillator may correspond to the DCXO 102 discussed above.

As further shown in FIG. 6A, process 600A may include obtaining, by the correlation module, aiding information which is determined based on information about the crystal oscillator (block 620). In embodiments, the information about the crystal oscillator may indicate a temperature of the crystal oscillator. In embodiments, the aiding information may correspond to the correlation aiding information discussed above.

As further shown in FIG. 6A, process 600A may include performing, by the correlation module, compensation processing on numerically-controlled oscillator (NCO) state data based on the aiding information, to obtain compensated NCO state data (block 630). In embodiments, the NCO state data may correspond to the values of the NCO state stored in the NCO registers 1071 discussed above.

As further shown in FIG. 6A, process 600A may include performing, by the correlation module, signal processing on the sample data based on the compensated NCO state data, to obtain compensated sample data (block 640). In embodiments, the signal processing may correspond to the signal processing performed by the signal processing module 1072 discussed above.

As further shown in FIG. 6A, process 600A may include performing, by the correlation module, correlation processing on the compensated sample data (block 650). In embodiments, the correlation processing may correspond to the correlation processing performed by the correlator 1073 discussed above.

As further shown in FIG. 6A, process 600A may include determining location information about a location of an electronic device corresponding to the correlation module based on a result of the correlation processing (block 660).

In embodiments, the sample data may correspond to a channel from among a plurality of channels associated with the GNSS signal, and the compensation processing may be performed by the correlation module for a block of the sample data which corresponds to an entire context period of the channel.

In embodiments, the sample data may be obtained by the correlation module from an ISM circular buffer, and the aiding information may be obtained by the correlation module from an aiding circular buffer.

In embodiments, the correlation processing may include correlating, by the correlation module, the compensated sample data against a pseudo-random number code which is generated by the correlation module based on the GNSS signal.

The method may further include performing, by an accumulation module, additional compensation processing on the NCO state data based on additional aiding information.

The GNSS signal may include at least one from among a GPS signal, a GLONASS signal, a BeiDou Navigation Satellite System signal, a Galileo GNSS signal, a QZSS signal, and a KASS) signal. A time interval of the compensation processing performed by the correlation module may be one millisecond, and a time interval of the additional compensation processing performed by the accumulation module may be twenty milliseconds.

In embodiments, the NCO state data may include a carrier acceleration parameter and a carrier frequency parameter, and the aiding information may include a carrier acceleration aiding value, a carrier frequency aiding value, and a time tag corresponding to the carrier acceleration aiding value and the carrier frequency aiding value.

Figure 6B:
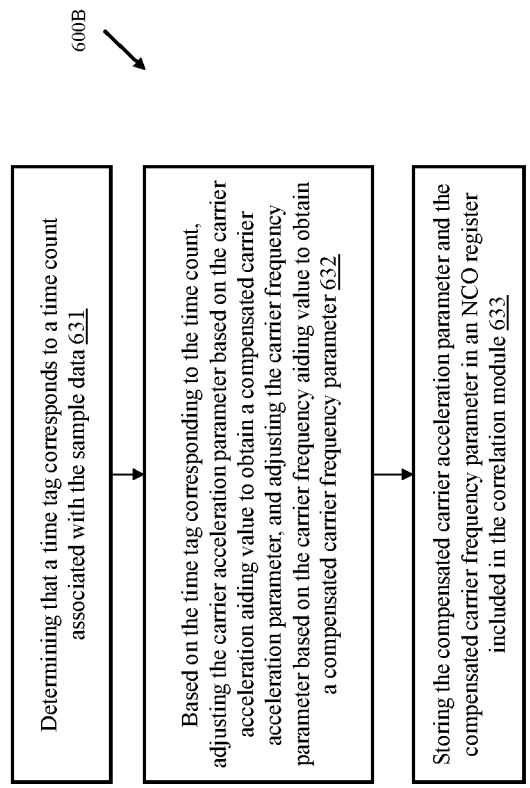

FIG. 6B is a flow chart of process 600B for compensating a GNSS signal, according to an embodiment. In some implementations, one or more process blocks of FIG. 6A may be performed by one or more of the elements discussed above, for example one or more of the GNSS receiver system 100 and the elements included therein, and the correlation module 107 and the elements included therein. In embodiments, one or more operations of the process 600B may be included in block 630 discussed above.

As shown in FIG. 6A, process 600A may include determining that a time tag corresponds to a time count associated with the sample data (block 631).

As further shown in FIG. 6B, process 600B may include, based on the time tag corresponding to the time count, adjusting the carrier acceleration parameter based on the carrier acceleration aiding value to obtain a compensated carrier acceleration parameter, and adjusting the carrier frequency parameter based on the carrier frequency aiding value to obtain a compensated carrier frequency parameter (block 632).

As further shown in FIG. 6B, process 600B may include storing the compensated carrier acceleration parameter and the compensated carrier frequency parameter in an NCO register included in the correlation module (block 633). In embodiments, the NCO register may correspond to the NCO registers 1071 and the elements included therein.

Although FIGS. 6A and 6B show example blocks of processes 600A and 600B, in some implementations, processes 600A and 600B may include additional blocks, fewer blocks, different blocks, or differently arranged blocks than those depicted in FIGS. 6A and 6B. Additionally, or alternatively, two or more of the blocks of processes 600A and 600B may be performed in parallel.

Accordingly, embodiments may provide a GNSS receiver system for acquisition and tracking of satellites of GNSS constellations, which may perform more frequent DCXO crystal temperature corrections. These DCXO crystal temperature corrections may allow the GNSS receiver system to compensate for DCXO frequency variations caused by variations in the DCXO crystal temperature. For example, embodiments may enable application of DCXO temperature corrections to signal processing prior to correlation, rather than after correlation and accumulation of a large block of data. This may allow more frequent corrections, and therefore improved performance of the GNSS receiver system.

Figure 7:
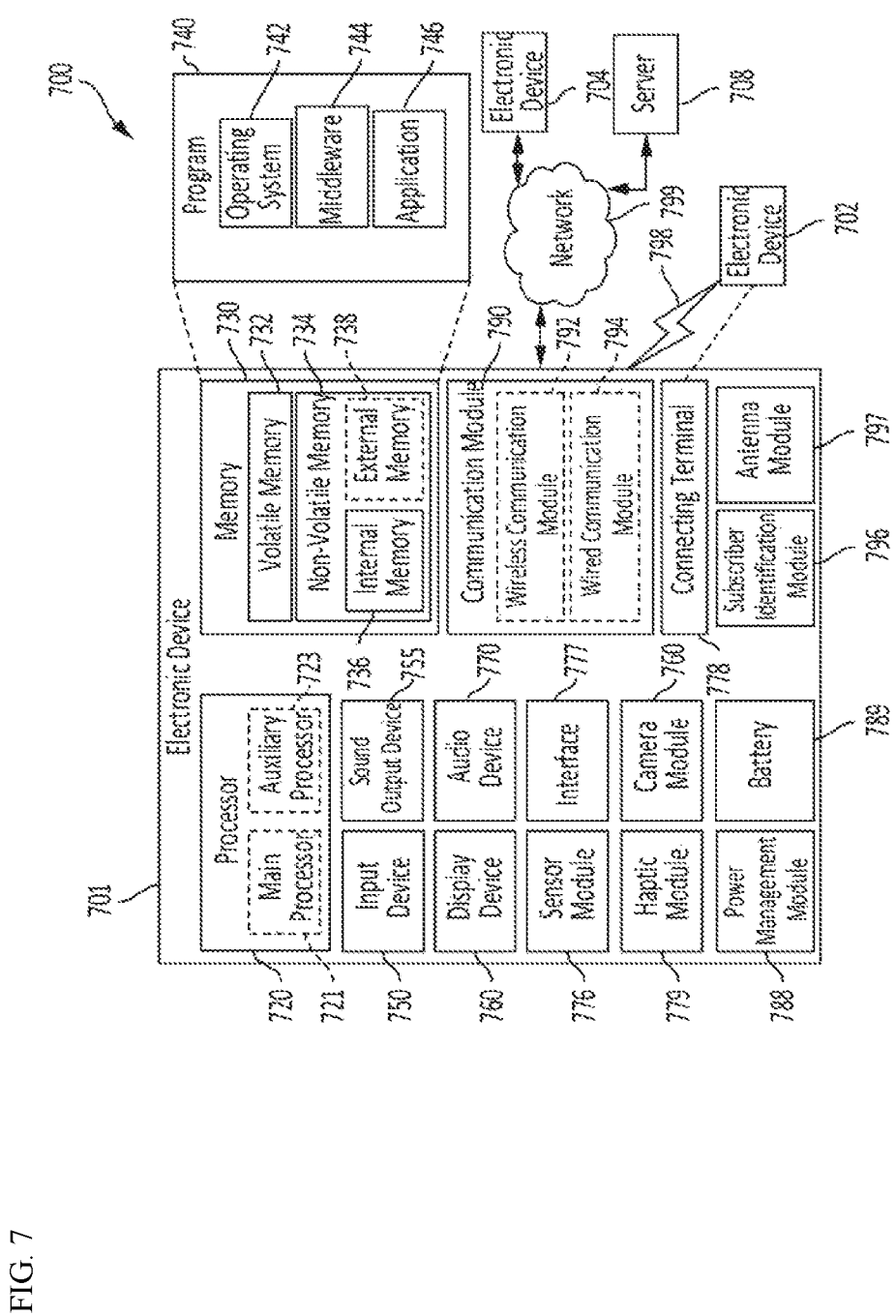
FIG. 7 is a block diagram of an electronic device in a network environment, according to an embodiment.

FIG. 7 is a block diagram of an electronic device in a network environment 700, according to an embodiment.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734. Non-volatile memory 734 may include internal memory 736 and/or external memory 738.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Figure 8:
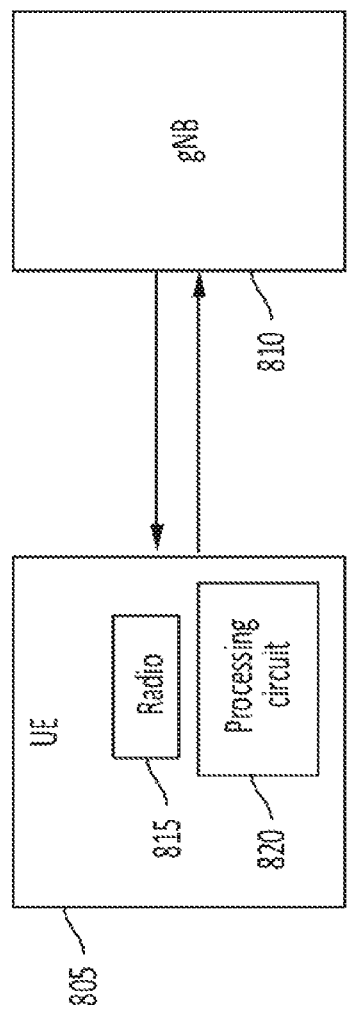
FIG. 8 shows a system including a UE and a gNB in communication with each other.

FIG. 8 shows a system including a UE 805 and a gNB 810, in communication with each other. The UE may include a radio 815 and a processing circuit (or a means for processing) 820, which may perform various methods disclosed herein, e.g., the method illustrated in FIG. 1. For example, the processing circuit 820 may receive, via the radio 815, transmissions from the network node (gNB) 810, and the processing circuit 820 may transmit, via the radio 815, signals to the gNB 810.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for compensating a global navigation satellite system (GNSS) signal, the method comprising:
    obtaining, by a correlation module, sample data which corresponds to a GNSS signal obtained based on an oscillator frequency of a crystal oscillator;
    obtaining, by the correlation module, aiding information which is determined based on information about the crystal oscillator;
    performing, by the correlation module, compensation processing on numerically-controlled oscillator (NCO) state data based on the aiding information, to obtain compensated NCO state data;
    performing, by the correlation module, signal processing on the sample data based on the compensated NCO state data, to obtain compensated sample data; and
    performing, by the correlation module, correlation processing on the compensated sample data; and determining location information about a location of an electronic device corresponding to the correlation module based on a result of the correlation processing.

2. The method of claim 1, wherein the sample data corresponds to a channel from among a plurality of channels associated with the GNSS signal, and
wherein the compensation processing is performed by the correlation module for a block of the sample data which corresponds to an entire context period of the channel.

3. The method of claim 1, wherein the sample data is obtained by the correlation module from an input sample memory (ISM) circular buffer, and
wherein the aiding information is obtained by the correlation module from an aiding circular buffer.

4. The method of claim 1, wherein the NCO state data comprises a carrier acceleration parameter and a carrier frequency parameter,
wherein the aiding information comprises a carrier acceleration aiding value, a carrier frequency aiding value, and a time tag corresponding to the carrier acceleration aiding value and the carrier frequency aiding value.

5. The method of claim 4, wherein the compensation processing comprises:
determining that the time tag corresponds to a time count associated with the sample data;
based on the time tag corresponding to the time count, adjusting the carrier acceleration parameter based on the carrier acceleration aiding value to obtain a compensated carrier acceleration parameter, and adjusting the carrier frequency parameter based on the carrier frequency aiding value to obtain a compensated carrier frequency parameter; and
storing the compensated carrier acceleration parameter and the compensated carrier frequency parameter in an NCO register included in the correlation module.

6. The method of claim 1, wherein the correlation processing comprises correlating, by the correlation module, the compensated sample data against a pseudo-random number code which is generated by the correlation module based on the GNSS signal.

7. The method of claim 1, further comprising performing, by an accumulation module, additional compensation processing on the NCO state data based on additional aiding information.

8. The method of claim 7, wherein the information about the crystal oscillator indicates a temperature of the crystal oscillator,
wherein the GNSS signal comprises at least one from among a global positioning system (GPS) signal, a Globalnaya Navigatsionnaya Sputnikovaya Sistema (GLONASS) signal, a BeiDou Navigation Satellite System signal, a Galileo GNSS signal, a Quasi-Zenith Satellite System (QZSS) signal, and a Korea Augmentation Satellite System (KASS) signal,
wherein a time interval of the compensation processing performed by the correlation module is one millisecond, and
wherein a time interval of the additional compensation processing performed by the accumulation module is twenty milliseconds.

9. A system for compensating a global navigation satellite system (GNSS) signal, the system comprising:
a crystal oscillator configured to output a clock signal indicating an oscillator frequency, and a status signal indicating information about the crystal oscillator;
a radio-frequency (RF) integrated circuit configured to receive a GNSS signal, and to output RF data corresponding to the GNSS signal based on the oscillator frequency; and
an electronic device comprising at least one processor configured to:
obtain, by a correlation module, sample data which corresponds to the RF data;
obtain, by the correlation module, aiding information which is determined based on the information about the crystal oscillator;
perform, by the correlation module, compensation processing on numerically-controlled oscillator (NCO) state data based on the aiding information, to obtain compensated NCO state data;
perform, by the correlation module, signal processing on the sample data based on the compensated NCO state data, to obtain compensated sample data; and
perform, by the correlation module, correlation processing on the compensated sample data; and
determine location information about a location of the electronic device based on a result of the correlation processing.

10. The system of claim 9, wherein the sample data corresponds to a channel from among a plurality of channels associated with the GNSS signal, and
wherein the compensation processing is performed by the correlation module for a block of the sample data which corresponds to an entire context period of the channel.

11. The system of claim 9, wherein the sample data is obtained by the correlation module from an input sample memory (ISM) circular buffer, and
wherein the aiding information is obtained by the correlation module from an aiding circular buffer.

12. The system of claim 9, wherein the NCO state data comprises a carrier acceleration parameter and a carrier frequency parameter,
wherein the aiding information comprises a carrier acceleration aiding value, a carrier frequency aiding value, and a time tag corresponding to the carrier acceleration aiding value and the carrier frequency aiding value.

13. The system of claim 12, wherein to perform the compensation processing, the at least one processor is further configured to:
determine that the time tag corresponds to a time count associated with the sample data;
based on the time tag corresponding to the time count, adjust the carrier acceleration parameter based on the carrier acceleration aiding value to obtain a compensated carrier acceleration parameter, and adjust the carrier frequency parameter based on the carrier frequency aiding value to obtain a compensated carrier frequency parameter; and
store the compensated carrier acceleration parameter and the compensated carrier frequency parameter in an NCO register included in the correlation module.

14. The system of claim 9, wherein to perform the correlation processing, the at least one processor is further configured to correlate, by the correlation module, the compensated sample data against a pseudo-random number code which is generated by the correlation module based on the GNSS signal.

15. The system of claim 14, wherein the at least one processor is further configured to perform, by an accumulation module, additional compensation processing on the NCO state data based on additional aiding information.

16. The system of claim 15, wherein the information about the crystal oscillator indicates a temperature of the crystal oscillator, wherein the GNSS signal comprises at least one from among a global positioning system (GPS) signal, a Globalnaya Navigatsionnaya Sputnikovaya Sistema (GLONASS) signal, a BeiDou Navigation Satellite System signal, a Galileo GNSS signal, a Quasi-Zenith Satellite System (QZSS) signal, and a Korea Augmentation Satellite System (KASS) signal, wherein a time interval of the compensation processing performed by the correlation module is one millisecond, and wherein a time interval of the additional compensation processing performed by the accumulation module is twenty milliseconds.

17. An electronic device for compensating a global navigation satellite system (GNSS) signal, the electronic device comprising:

at least one processor configured to:
  obtain, by a correlation module, sample data which corresponds to a GNSS signal obtained based on an oscillator frequency of a crystal oscillator;
  obtain, by the correlation module, aiding information which is determined based on information about the crystal oscillator;
  perform, by the correlation module, compensation processing on numerically-controlled oscillator (NCO) state data based on the aiding information, to obtain compensated NCO state data;
  perform, by the correlation module, signal processing on the sample data based on the compensated NCO state data, to obtain compensated sample data; and
  perform, by the correlation module, correlation processing on the compensated sample data; and
  determine location information about a location of the electronic device based on a result of the correlation processing.

18. The electronic device of claim 17, wherein the NCO state data comprises a carrier acceleration parameter and a carrier frequency parameter, wherein the aiding information comprises a carrier acceleration aiding value, a carrier frequency aiding value, and a time tag corresponding to the carrier acceleration aiding value and the carrier frequency aiding value.

19. The electronic device of claim 18, wherein to perform the compensation processing, the at least one processor is further configured to:

determine that the time tag corresponds to a time count associated with the sample data;

based on the time tag corresponding to the time count, adjust the carrier acceleration parameter based on the carrier acceleration aiding value to obtain a compensated carrier acceleration parameter, and adjust the carrier frequency parameter based on the carrier frequency aiding value to obtain a compensated carrier frequency parameter, and store the compensated carrier acceleration parameter and the compensated carrier frequency parameter in an NCO register included in the correlation module.

20. The electronic device of claim 19, wherein the at least one processor is further configured to perform, by an accumulation module, additional compensation processing on the NCO state data based on additional aiding information.

* * * * *